(No Model.)
W. B. CRAFT.
SAND SCREENING APPARATUS.
No. 419,930. Patented Jan. 21, 1890.
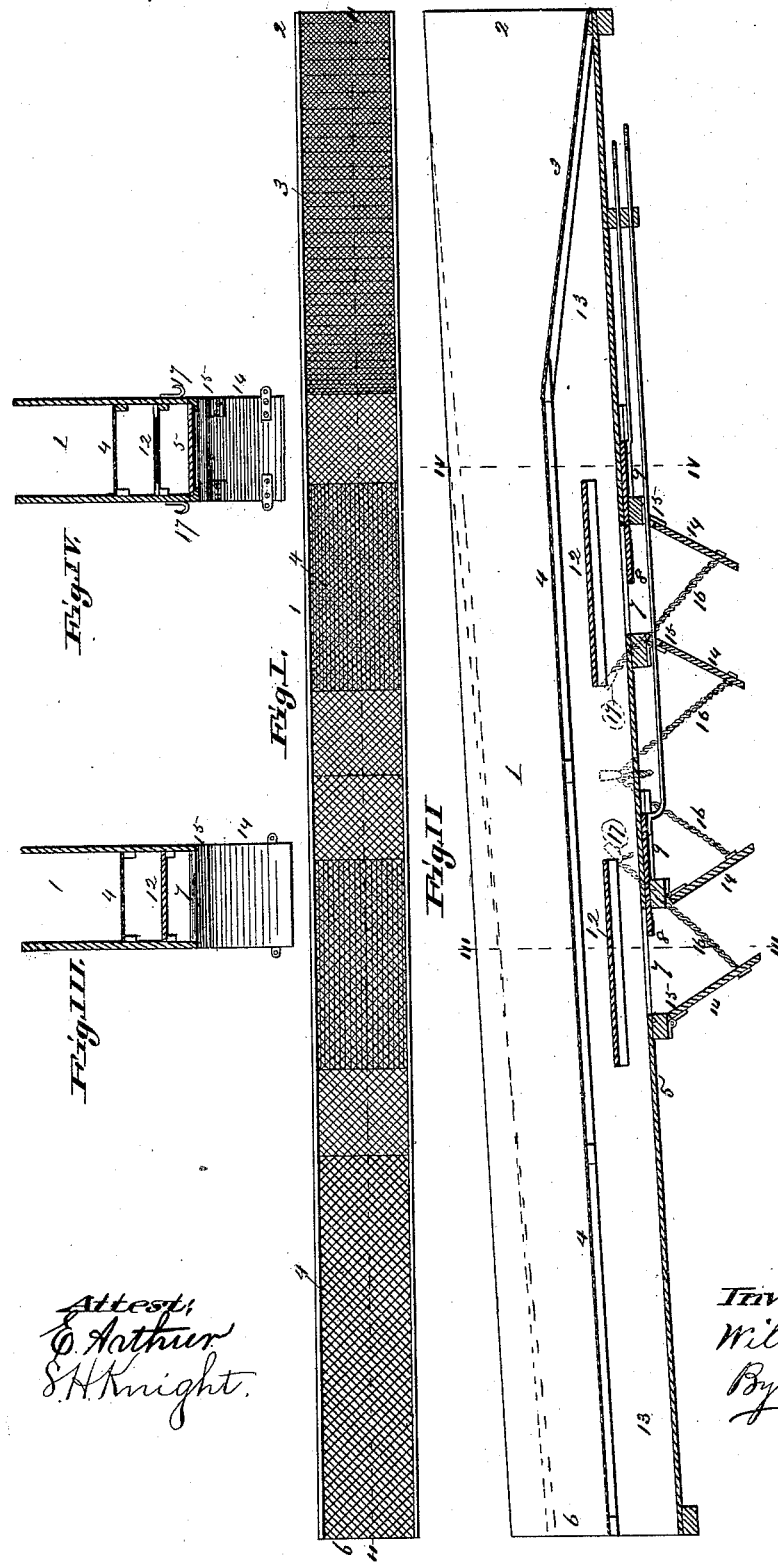

UNITED STATES PATENT OFFICE.

WILLIAM B. CRAFT, OF ST. LOUIS, MISSOURI.

SAND-SCREENING APPARATUS.

SPECIFICATION forming part of Letters Patent No. 419,930, dated January 21, 1890.

Application filed July 16, 1889. Serial No. 317,694. (No model.)

*To all whom it may concern:*

Be it known that I, WILLIAM B. CRAFT, of the city of St. Louis, in the State of Missouri, have invented a certain new and useful Improvement in Sand-Screening Apparatuses, of which the following is a full, clear, and exact description, reference being had to the accompanying drawings, forming part of this specification.

This may be regarded as in some respects an improvement upon the sand-screen shown and described in Letters Patent No. 174,981, granted to Henry Schultz, of Milwaukee, Wisconsin, March 21, 1876.

In the present device the screen is shown extending the whole length of the spout or conveyer, and openings are made in the bottom of the spout or race for the discharge of the sand mixed with more or less water.

Reference is made to the claims for other novel features.

Figure I is a top view with the cover removed. Fig. II is a longitudinal section at II II, Fig. I. Fig. III is a transverse section at III III, Fig. II. Fig. IV is a transverse section at IV IV, Fig. II.

1 is the spout or conveyer, which may be of any suitable form and dimension.

2 is the receiving end of the conveyer, into which the mixture of water, sand, and gravel is discharged by a sand-pump or other device. (Not shown.)

3 is a screen of wire-work or perforated metal, which inclines upwardly from the end 2. The meshes of the screen 3 are such as to let the sand pass through, while the gravel passes along the screen onto another screen 4, which is shown parallel with the bottom 5 of the conveyer. The screen 4 may be made in sections extending all the way to the discharging end 6 of the conveyer, or it may, if preferred, be made in one piece. Imperforate metal or wood may take the place of part of the screen 4. It is proposed that all or nearly all of the sand shall pass through the screens 3 and 4, while the gravel passes along the top of the screens to the discharge end 6, over which it passes with more or less of the water. The rest of the water passes through the screens with the sand and passes along the space between the screens and the bottom 5.

At 7 are openings in the bottom 5 for the discharge of the sand. These openings extend across the bottom and are regulated as to area by sliding plates 8, whose edges work upon cleats 9. The plates 8 extend from side to side of the conveyer and have longitudinal movement, so that whatever position they may be placed in the opening until wholly closed will extend all across the conveyer. These openings will be so limited in size (by the plates) that little except sand will pass through them.

10 are rods attached at one end to the plates 8, and the other end having a handle 11, which is in easy reach of the attendant, so that he may move the slide-plates 8. Over the openings 7 are plates 12, extending from side to side of the conveyer and parallel with the bottom of the conveyer. The mixture of water and sand in the space or passage 13 between the bottom 5 and the screens will separate to a considerable degree the sand descending, so that the portion containing the larger part of the sand will pass beneath the plates 12, while the water containing but little of the sand will pass over the plates 12, and will thus be prevented from flowing down through the holes 7. In the absence of the boards 12 the water directly over the openings 7 and in the upper part of the space 13 would descend, and the part which did not escape would stir up the sand and interfere with its possession of the lower part of the space 13. Only two of these openings 7 are shown. There may be as many as desired and placed at any distance from the ends.

At 14 are seen deflector-plates, which are hinged to the conveyer at the upper edge 15. The purpose of these deflectors is to carry the sand to the desired place upon the sand barge or scow. I prefer to give the conveyer a slight downward slope from the receiving to the discharging end, so as to assist the material in its passage through it.

16 are chains, the lower ends of which are fast to the deflectors and which engage on hooks or pins 17 at the sides of the conveyer. These chains are for support of the deflectors in any desired position. The sides of the conveyer may be inclined downward toward the discharging end, as indicated by the broken line in Fig. II.

The conveyer may at times be used without the screens 3 4 in cases where there is nothing to be screened out, and all that is required is to separate the superfluous water from the earthy material, the latter passing beneath the plates 12, while the main body of the water passes over the plates 12 and is discharged at the end 6 of the conveyer.

I claim as my invention—

1. The combination, in a sand-screening apparatus, of a conveyer 1 with a screen extending longitudinally therethrough above its bottom, said bottom having openings to allow the escape of the material beneath the screen, substantially as set forth.

2. The combination, in a sand-screening apparatus, of a conveyer 1, having a screen extending longitudinally therethrough above its bottom, the first portion 3 of said screen having an upward inclination and the portion 4 being substantially parallel with the bottom, as herein shown and described.

3. In an apparatus for screening sand, a conveyer 1, having a longitudinal screen above the bottom, discharge-opening in the bottom, and a plate 12 over the opening, substantially as and for the purpose set forth.

4. The combination, in a sand-separating apparatus, of a conveyer 1, having a longitudinal screen extending between the top and bottom, said bottom having openings for the discharge of the sand, deflectors 14 at the edges of the openings, and slide-plates 8, for adjusting the sizes of the openings, for the purpose herein set forth.

WM. B. CRAFT.

In presence of—
SAML. KNIGHT,
BENJN. A. KNIGHT.